(12) United States Patent
Bannai et al.

(10) Patent No.: US 8,435,672 B2
(45) Date of Patent: May 7, 2013

(54) LITHIUM ION SECONDARY BATTERY

(75) Inventors: Yutaka Bannai, Sendai (JP); Tatsuji Numata, Sendai (JP); Ryuichi Kasahara, Sendai (JP)

(73) Assignee: NEC Energy Devices, Ltd., Sagamihara-shi (JP)

( * ) Notice: Subject to any disclaimer, the term of this patent is extended or adjusted under 35 U.S.C. 154(b) by 1311 days.

(21) Appl. No.: 11/785,622

(22) Filed: Apr. 19, 2007

(65) Prior Publication Data

US 2007/0248885 A1   Oct. 25, 2007

(30) Foreign Application Priority Data

Apr. 20, 2006  (JP) .................................. 2006-116733

(51) Int. Cl.
*H01M 10/0525* (2010.01)
*H01M 4/133* (2010.01)

(52) U.S. Cl.
USPC .................. 429/223; 429/231.8; 429/231.95; 429/324

(58) Field of Classification Search .................. None
See application file for complete search history.

(56) References Cited

U.S. PATENT DOCUMENTS

| 5,219,680 A * | 6/1993 | Fauteux ........................ 429/306 |
| 6,300,012 B1 * | 10/2001 | Iijima et al. ................. 429/231.8 |
| 2003/0054249 A1 * | 3/2003 | Yamamoto et al. ........ 429/231.1 |
| 2003/0082453 A1 * | 5/2003 | Numata et al. ........... 429/231.95 |

FOREIGN PATENT DOCUMENTS

JP             05-036413 A       2/1993

\* cited by examiner

*Primary Examiner* — Ula C. Ruddock
*Assistant Examiner* — Alix Echelmeyer
(74) *Attorney, Agent, or Firm* — Westerman, Hattori, Daniels & Adrian, LLP

(57) ABSTRACT

The invention provides a lithium ion secondary battery comprising a positive electrode, a negative electrode and an electrolysis solution containing an aprotic solvent having an electrolyte dissolved in it, wherein the negative electrodes uses an amorphous carbon material as a negative electrode active material. The amorphous carbon material has (A) an average particle diameter (median size) of 7 μm to 20 μm inclusive as measured by a laser diffraction scattering method and (B) a particle size distribution as measured by a laser diffraction scattering method, in which distribution the ratio of particles of less than 3 μm in diameter is 1% by mass to 10% mass inclusive, and is free of an electrical conducting material.

4 Claims, 1 Drawing Sheet

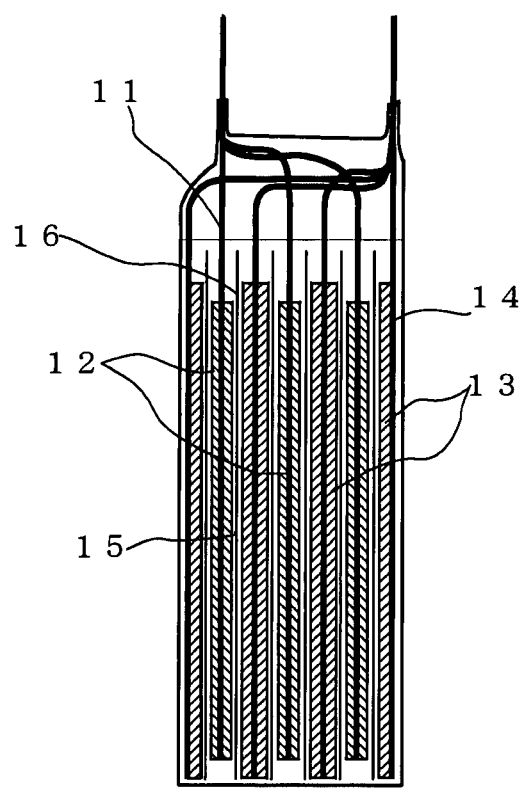

LITHIUM ION SECONDARY BATTERY

CROSS-REFERENCE TO RELATED APPLICATIONS

This application is based upon and claims the benefit of priority from prior Japanese Application No. 2006-116733, filed on Apr. 20, 2006, the entire contents of which are incorporated herein by reference.

BACKGROUND

1. Technical Field

The present invention relates generally to a lithium ion secondary battery, and more particularly to a lithium ion secondary battery using a negative electrode material with its capacity reduction held back.

2. Related Art

Lithium ion secondary batteries with a lithium containing composite oxide as a positive electrode and a carbon material or lithium metal as a negative electrode, because of achieving high energy densities, have now attracted attention as power sources for cellular phones, notebook PCs, etc. They have also received attention as power sources for hybrid cars, because of making sure high input/output performance.

Generally for a typical lithium ion secondary battery, the negative electrode comprises a negative electrode active material layer in which a negative electrode active material composed mainly of carbon is mixed with an electrical conducting material for making sure electrical conductivity in the active material layer and a binder for making sure inter-particle adhesion.

For instance, Japanese Patent No. 3239302 discloses a negative electrode in which carbon of low graphitization (a carbon material including an amorphous moiety and a crystalline moiety) is mixed with finely divided carbon particles and/or fine fibrous graphite, and describes that, by using that, losses of charge/discharge capacity are reduced with improvements in charge/discharge cycle performance.

JP-A-2002-231316 puts forward a negative electrode comprising a mixture of a carbon material of low crystallinity with 2 to 6% by mass of an electrical conducting material higher in electrical conductivity than that carbon material of low crystallinity, and alleges that, by using that, the internal resistance of the battery is kept against increasing with improvements in the output performance. With the technique of this prior publication, however, the use of the electrical conducting material causes a drop of the ratio of the active material in the negative electrode, which otherwise brings about a lowering of the negative electrode capacity.

JP-A-2002-334693 shows a negative electrode comprising a mixture of a carbon material having a latice spacing of 0.335 to 0.410 nm with 5 to 30% of vapor-grown carbon fibers, and alleges that, by using that, electrode reactions proceeds so smoothly that there are improvements in charge/discharge cycle performance, etc.

However, the vapor-grown carbon fibers described there as acting as a combined active material and electrical conducting material has a high degree of graphitization given in terms of the (002) lattice spacing of 0.336 to 0.337 nm: it is substantially made up of a carbon material/graphite mixture that may work for prevention of a lowering of the negative electrode capacity. However, the mixing ratio must be brought up to as high as 5 to 30% to make sure electrical conductivity, which may have a risk of incurring side effects having adverse influences on battery performance, for instance, the breakdown of an electrolysis solution due to its reaction with graphite.

SUMMARY

The present invention provides a lithium ion secondary battery wherein, by using an amorphous carbon material as a negative electrode active material and depriving a negative electrode of an electrical conducting material, a negative electrode is kept against capacity reductions.

More specifically, the present invention provides a lithium ion secondary battery comprising a positive electrode, a negative electrode and an electrolysis solution containing an aprotic solvent having an electrolyte dissolved in it, wherein said negative electrodes uses an amorphous carbon material as a negative electrode active material, wherein said amorphous carbon material has (A) the average particle diameter (median size) of 7 μm to 20 μm inclusive as measured by a laser diffraction scattering method and (B) a particle size distribution as measured by a laser diffraction scattering method, in which distribution the ratio of particles of less than 3 μm in a diameter is 1% by mass to 10% mass inclusive, and is free of an electrical conducting material.

In the lithium ion secondary battery of the invention, said amorphous carbon material has (C) a weight change of less than 3% by weight as measured after 50 hours in an environment having a temperature of 40° C. and a humidity of 90%.

According to the invention wherein the negative electrode is free of any electrical conducting material, it is possible to make high the ratio of the active material in the negative electrode and, hence, make improvements in the capacity of the battery.

BRIEF DESCRIPTION OF THE DRAWINGS

The invention will be described with reference to the accompanying drawings, wherein like numbers reference like elements.

FIG. 1 is illustrative of one embodiment of the lithium ion secondary battery according to the invention.

DESCRIPTION OF EXEMPLARY EMBODIMENTS

In the lithium ion secondary battery of the invention, as shown in FIG. 1, a positive electrode layer 12 formed on a positive electrode collector 11 and containing a positive electrode active material capable of inserting and de-inserting lithium ions is located in opposition to a negative electrode layer 13 formed on a negative electrode collector 14 and containing a negative electrode active material capable of inserting and de-inserting lithium ions via an electrolysis solution 15 and a separator 16 containing it.

For the positive electrode collector 11, aluminum, stainless steel, nickel or titanium, or their alloy may be used, and for the negative electrode collector 14, copper, stainless steel, nickel or titanium, or their alloy may be used.

For the separator 16, a porous film such as a film of a resin such as polypropylene, polyethylene or other polyolefin resin, and fluororesin may be used.

For the positive electrode active material, a composite oxide containing lithium may be used. The lithium-containing composite oxide is here exemplified by a compound having a formula: $LiM_xO_y$ where M is one or two or more elements selected from Mn, Fe, Co and Ni, provided that a part of those elements may be substituted by Mg, Al, Ti or the like, or other cations. For instance, $LiMn_2O_4$ may be used.

The positive electrode active material is dispersed and kneaded with an electrical conducting material such as carbon black and a binder such as polyvinylidene fluoride (PVdF) in a solvent such as N-methyl-2-pyrrolidone (NMP). Then, the mixture is coated or otherwise formed on the positive electrode collector such an aluminum foil to obtain the positive electrode layer 12.

The amorphous carbon material that is the negative electrode active material is dispersed and kneaded with a binder such as polyvinylidene fluoride (PVdF) in a solvent such as N-methyl-2-pyrrolidone (NMP). Then, the mixture is coated or otherwise formed on the negative electrode collector such as a copper foil to obtain the negative electrode layer 13.

The "amorphous carbon material" referred to here means a carbon material that has no incremental crystal structure change upon the insertion and de-insertion of lithium ions in association with charge and discharge. Note here that the structure change is also called a stage structure change. Whether or not the carbon material is amorphous or crystalline may be checked by the measurement of X-ray diffraction spectra. When there is a crystalline carbon material involved, there is a definite or sharp peak appearing in X-ray diffraction spectra due to the presence of a crystal structure.

Upon insertion of lithium ions, there is lithium inserted between carbon layers. As a result, the lattices pacing between the carbon layers grows wide: there is the lattice spacing growing wide, which involves a structure change that is detected as a shift of the peak position and a change in the peak shape.

When the negative electrode active material comprises an amorphous carbon material, on the other hand, there are broad X-ray diffraction spectra observed, or there is no or little peak spectrum detected, and even upon insertion of lithium ions, there is no definite peak change observed, so that whether the carbon material sample is amorphous or crystalline can be checked by the presence or absence of a peak change in the spectra. The physical properties of a carbon material include a graphite layer spacing: $d_{002}$, a crystallite size: La, Lc, a specific surface area measured as by a nitrogen adsorption method, etc.; however, the aforesaid peak change in the X-ray diffraction spectra is preferably used for the judgment of whether or not it is amorphous.

To deprive the negative electrode of any electrical conducting material, the amorphous carbon material used should preferably have (A) an average particle diameter (median size) of 7 µm to 20 µm inclusive as measured by a laser diffraction scattering method and (B) a particle size distribution as measured by a laser diffraction scattering method, in which distribution the ratio of particles of less than 3 µm in diameter is 1% by mass to 10% mass inclusive.

By using the amorphous carbon material that satisfies both (A) and (B), fine particles having a particle diameter of less than 3 µm are allowed to act as an active material and an electrical conducting material, so that there can be electrical conductivity ensured in the negative electrode without using any electrical conducting material.

Average particle diameters of less than 7 µm are not preferable, because the ratio of fine particles increases, and fine particle shows high reactivity with the electrolysis solution, resulting in the breakdown of the solvent in the electrolysis solution and, hence, a decease in the service life of the battery. Average particle diameters exceeding 20 µm are again not preferable because contacts between particles are hardly maintained.

That the ratio of particles having a particle diameter of less than 3 µm is less than 10% is not preferable, because the ratio of fine particles becomes too low for the action of the electrical conducting material, and that the ratio of particles having a particle diameter of less than 3 µm exceeds 10% is again not preferable, because the ratio of fine particles grows too large, making high the reactivity of the amorphous carbon material with the electrolysis solution, with the result that there is the solvent in the electrolysis solution breaking down, leading to a decrease in the service life of the battery.

More preferable conditions for taking the full advantage of the invention are (a) the average particle diameter of 7 µm to 15 µm inclusive as measured by a laser diffraction scattering method, and (b) the particle size distribution as measured by a laser diffraction scattering method, in which distribution the ratio of particles having a particle diameter of less than 3 µm is 2% to 7% inclusive. To make sure the long-term reliability of the negative electrode, the amorphous carbon material should also preferably have a weight change of less than 3% by mass after 50 hours in an environment having a temperature of 40° C. and a humidity of 90%. Weight changes exceeding 3% by mass are not preferable, because there is much moisture adsorbed to the amorphous carbon material, incurring degradation of the negative electrode and a decrease in the service life of the battery. A more preferable condition for taking the full advantage of the invention is (c) the weight change of less than 2% by mass after 50 hours in an environment having a temperature of 40° C. and a humidity of 90%.

Electrolysis Solution

For an electrolysis solution 15, an aprotic solvent having an electrolyte dissolved in it may be used. In the case of a lithium ion secondary battery, a lithium salt used for the electrolyte is dissolved in the aprotic solvent. For the lithium salt, shows lithium imide salt, $LiPF_6$, $LiAsF_6$, $LiAlCl_4$, $LiClO_4$, $LiBF_4$ and $LiSbF_6$, among which $LiPF_6$, and $LiBF_4$ is most preferable. For the lithium imide salts, there is the mention of $LiN(C_kF_{2k+1}SO_2)(C_mF_{2m+1}SO_2)$ where k, and m is independently 1 or 2. These may be used alone or in combination of two or more.

The aprotic solvent used here, for instance, includes at least one of organic solvents such as cyclic carbonates, chain carbonates, aliphatic carboxylic acid esters, γ-lactones, cyclic ethers and chain ethers as well as their fluoride derivatives. More specifically, use is made of cyclic carbonates such as propylene carbonate (PC), ethylene carbonate (EC), butylene carbonate (BC) and their derivatives; chain carbonates such as dimethyl carbonate (DMC), diethyl carbonate (DEC), ethyl methyl carbonate (EMC), dipropyl carbonate (DPC) and their derivatives; aliphatic carboxylic acid esters such as methyl formate, methyl acetate, ethyl propionate and their derivatives; γ-lactones such as γ-butylolactone and their derivatives; chain ethers such as 1,2-ethoxyethane (DEE), ethoxymethoxyethane (EME), diethyl ether, and their derivatives; cyclic ethers such as tetrahydrofuran, and 2-methyltetrahydrofuran; dimethysulfoxide; 1,3-dioxolan; formamide; acetamide; dimethylformamide; dioxolan; acetonitrile; propylnitrile; nitromethane; ethyl monoglime; phosphoric acid triester; trimethoxymethane; dioxolan derivatives; sulfolane; methylsulfolane; 1,3-dimethyl-2-imidazolidinone; 3-methyl-2-oxazolidinone; propylene carbonate derivatives; tetrahydrofuran derivatives; ethyl ether; 1,3-propanesultone, anisole; N-methylpyrrolidone; and fluorinated carboxylic acid esters, which may be used alone or in admixture of two or more.

Further, vinylene carbonate (VC), etc. may be added as an additive to the electrolysis solution.

The lithium ion secondary battery according to the invention may be configured in various forms such as cylindrical, prismatic, coin and laminated forms. Of these, the laminated type battery is sealed up with a film wrap made up of a flexible film having a laminated structure of a synthetic resin and a metal foil, so that its weight can be reduced. It is thus possible to use a film wrap made of a flexible film so as to improve the energy density of the battery.

The lithium ion secondary battery according to the invention is obtained by laminating the negative electrode layer 13 and the positive electrode layer 12 or winding them, via the separator 16, in a dry air or inert gas atmosphere, inserting them a film wrap, impregnating them with an electrolysis solution, and sealing up the film wrap.

EXAMPLES

Preparation of the Positive Electrode

The positive electrode active material and electrical conducting material were mixed together, and the mixture was uniformly dispersed in N-methyl-2-pyrrolidone (NMP) having a binder dissolved in it to make a slurry. For the positive active material $LiMn_2O_4$ was used; for the electrical conducting material carbon black was used; and for the binder polyvinylidene fluoride (PVdF) was used. After hat slurry was coated on a 25 μm-thick aluminum foil as the collector, NMP was evaporated off to form a positive electrode layer. The solid matter ratio of the positive electrode layer was set at positive electrode active material:electrical conducting material:binder=80:10:10 (% by mass)

Preparation of the Negative Electrode

In each of Examples 1-11 and Comparative Examples 1-10, the carbon material having an average particle diameter median size), ratio of particles of less than 3 μm and a moisture absorption set out in Table 1 and the binder (PVdF) were mixed together, and the mixture was uniformly dispersed in NMP to make a slurry. After that slurry was coated on a 20 μm thick copper foil for the negative electrode collector, NMP was evaporated off to form a negative electrode layer. The solid matter ratio of the negative electrode layer was set at amorphous carbon material:binder=90:10 (% by mass).

In each of Comparative Examples 11-13, the negative electrode layer was prepared following the Examples with the exception that acetylene black was used as the electrical conducting material set out in Table 1, and it was mixed with the binder (PVdF) at the solid matter ratio set out in Table 1.

For the battery electrolyte, use was made of ethylene carbonate (EC):propylene carbonate (PC):diethyl carbonate (DEC)=20:20:60 (% by mass) wherein 1 mol/L of $LiPF_6$ was dissolved as the electrolyte.

Assembling of the Coin Type Battery

A negative electrode sheet comprising a negative electrode layer formed on a negative electrode collector was punched out in a round form, and placed in one coin type case. Then, a separator comprising polyethylene was placed on the negative electrode layer for impregnation with an electrolysis solution, after which metallic lithium was placed on the separator. Then, another coin type case was placed over, and caulked with, the former case to make a coin type battery for measuring the negative electrode performance.

Measurement of the Capacity of the Negative Electrode

The capacity of the negative electrode was measured in terms of the amount of insertion and de-insertion of lithium. To be more specific, the electrode sample for the measurement of the capacity of the negative electrode was located in opposition to a counter electrode of metallic lithium to prepare a coin type battery. This battery was charged and discharged to find the capacity.

The battery was charged at 25° C. on a constant current having a current value of 0.25 mA and at a constant voltage down to a termination voltage of 0.0 V relative to the metallic lithium electrode, total charge time is 50 hours. Then, the battery was discharged on a constant current having a current value of 0.25 mA up to a discharge termination voltage of 2.5 V to measure its capacity. The discharge capacity of the electrode sample was figured out as capacity per unit area, which is indicated in Table 1.

For reliability testing, the battery was measured for its capacity, and then charged at room temperature on a constant current having a current value of 0.25 mA and at a constant voltage down to a termination voltage of 0.0 V for 50 hours. Thereafter, the battery was stored at 45° C. for two weeks, after which it was discharged at room temperature on a constant current. The then discharge capacity was divided by the discharge capacity at the time of capacity measurement to work out a negative electrode capacity sustenance rate which is indicated in Table 1 as an index to the reliability of the negative electrode.

TABLE 1

| | Amorphous carbon material | | |
|---|---|---|---|
| | Average particle diameter (μm) | Ratio of particles of less than 3 μm (%) | Moisture absorption (wt %) |
| Example 1 | 10.1 | 3.7 | 2.7 |
| Example 2 | 19.2 | 5.8 | 2.7 |
| Example 3 | 7.1 | 4.3 | 2.3 |
| Example 4 | 14.8 | 4.1 | 2.2 |
| Example 5 | 19.7 | 4.3 | 2.6 |
| Example 6 | 9.7 | 1.2 | 1.8 |
| Example 7 | 10.3 | 2.1 | 2.3 |
| Example 8 | 9.9 | 6.8 | 2.4 |
| Example 9 | 18.2 | 9.7 | 2.7 |
| Example 10 | 10.3 | 3.8 | 2.9 |
| Example 11 | 9.8 | 3.2 | 1.8 |
| Comp. Ex. 1 | 6.8 | 7.1 | 2.1 |
| Comp. Ex. 2 | 5.5 | 8.4 | 2.6 |
| Comp. Ex. 3 | 20.3 | 4.8 | 1.9 |
| Comp. Ex. 4 | 22.6 | 5.6 | 2.2 |
| Comp. Ex. 5 | 14.7 | 0.9 | 2.0 |
| Comp. Ex. 6 | 13.5 | 0.4 | 1.9 |
| Comp. Ex. 7 | 12.1 | 10.8 | 2.5 |
| Comp. Ex. 8 | 10.1 | 13.2 | 2.6 |
| Comp. Ex. 9 | 10.5 | 4.1 | 3.2 |
| Comp. Ex. 10 | 12.2 | 3.8 | 4.5 |
| Comp. Ex. 11 | 10.1 | 3.7 | 2.7 |
| Comp. Ex. 12 | 10.1 | 3.7 | 2.7 |
| Comp. Ex. 13 | 10.1 | 3.7 | 2.7 |

| | Solid matter ratio of the negative electrode (wt %) | | | Capacity of the negative electrode | Sustenance |
|---|---|---|---|---|---|
| | ACM* | ECI** | Binder | (mAh/cm$^2$) | (%)*** |
| Example 1 | 90 | 0 | 10 | 17.4 | 96.3 |
| Example 2 | 90 | 0 | 10 | 17.3 | 96.0 |
| Example 3 | 90 | 0 | 10 | 17.4 | 95.8 |
| Example 4 | 90 | 0 | 10 | 17.6 | 96.4 |
| Example 5 | 90 | 0 | 10 | 17.4 | 96.0 |
| Example 6 | 90 | 0 | 10 | 17.3 | 95.8 |
| Example 7 | 90 | 0 | 10 | 17.6 | 96.6 |
| Example 8 | 90 | 0 | 10 | 17.5 | 95.9 |
| Example 9 | 90 | 0 | 10 | 17.2 | 95.1 |
| Example 10 | 90 | 0 | 10 | 17.3 | 95.8 |
| Example 11 | 90 | 0 | 10 | 17.6 | 97.1 |
| Comp. Ex. 1 | 90 | 0 | 10 | 17.1 | 88.6 |
| Comp. Ex. 2 | 90 | 0 | 10 | 16.7 | 86.1 |

TABLE 1-continued

| | | | | | |
|---|---|---|---|---|---|
| Comp. Ex. 3 | 90 | 0 | 10 | 16.6 | 90.5 |
| Comp. Ex. 4 | 90 | 0 | 10 | 16.4 | 90.2 |
| Comp. Ex. 5 | 90 | 0 | 10 | 16.8 | 90.5 |
| Comp. Ex. 6 | 90 | 0 | 10 | 13.1 | 80.2 |
| Comp. Ex. 7 | 90 | 0 | 10 | 17.2 | 84.4 |
| Comp. Ex. 8 | 90 | 0 | 10 | 16.8 | 81.9 |
| Comp. Ex. 9 | 90 | 0 | 10 | 16.6 | 90.2 |
| Comp. Ex. 10 | 90 | 0 | 10 | 16.0 | 85.3 |
| Comp. Ex. 11 | 89 | 1 | 10 | 17.0 | 96.1 |
| Comp. Ex. 12 | 87 | 3 | 10 | 16.6 | 95.3 |
| Comp. Ex. 13 | 85 | 5 | 10 | 16.2 | 95.1 |

ACM*: Amorphous carbon material
ECI**: Electrical conducting material
Sustenance (%)***: Capacity Sustenance rate of the negative electrode The "average particle diameter" and "ratio of particles of less than 3 μm" were each measured with a particle size measurement meter on a laser diffraction scattering method (Microtrack MT3000 made by Nikkiso Co., Ltd.). Note here that the average particle diameter is given on a volume basis, and expressed by the frequency of the particles of less than 3 μm detected.

The "moisture adsorption" was worked out by drying the amorphous carbon material in vacuum at 100° C. for 24 hours, cooling it down to 40° C., letting it stand alone in a thermo-hygrostat having a temperature of 40° C. and a humidity of 90% for 50 hours, and measuring its weight change between before and after it was placed in the thermo-hygrostat.

Charge/Discharge Cycle Testing, and Storage Testing

The testing battery sealed up with a flexible film was charged up to a termination voltage 4.3 V at room temperature (25° C.) on a constant current having a current value of 2 A and at a constant voltage over 5 hours, and then discharged down to a termination voltage of 2.5 V on a constant current having a current value of 2 A. Thereafter, charge/discharge cycle testing was done at a charge rate of 1 C and a discharge rate of 1 C under the conditions of a charge termination voltage of 4.2 V and a discharge termination voltage of 2.5 V. The capacity sustenance rate (%) is set out in Table 2. The capacity sustenance rate (%) is figured out by dividing the discharge capacity after 500 cycles by the discharge capacity at the $10^{th}$ cycle.

Storability testing was done by charging the testing battery at room temperature up to 4.3 V on a current value of 2 A, and discharging it down to 2.5 V on a current value of 2 A. The then discharge capacity was taken as an initial discharge capacity. Thereafter, the battery was charged up to a termination voltage of 4.2 V on a constant current having a current value of 2 A and at a constant voltage over 2.5 hours, following which it was discharged up to a depth of discharge value of 50%. Afterwards, the battery was stored at 45° C. for 60 days for storability testing. After storage, the battery was discharged at room temperature on a constant current, and then charged on a constant current and discharged on a constant current in order. The then discharge capacity was taken as a recovery capacity. The capacity recovery rate set out in Table 2 was worked out from (Capacity recovery rate)=(Recovered capacity)/(Initial discharge capacity). The resistance rise rate set out in Table 2 was worked out by dividing the resistance value after storage by the resistance value at the storage start time.

The results obtained through the charge/discharge cycle testing and storage testing are shown in Table 2. The resistant rise rate—one index to storability is a value relative to the resistance value of 1 at the storage start time.

TABLE 2

| | Capacity sustenance rate after 500 cycles (%) | Storability | |
|---|---|---|---|
| | | RRR* | CRR* |
| Example 1 | 92.3 | 1.12 | 93.3 |
| Example 2 | 92.0 | 1.12 | 93.1 |
| Example 3 | 91.8 | 1.13 | 92.9 |
| Example 4 | 92.0 | 1.14 | 93.0 |
| Example 5 | 90.9 | 1.16 | 92.8 |
| Example 6 | 90.1 | 1.15 | 92.1 |
| Example 7 | 91.7 | 1.13 | 93.2 |
| Example 8 | 91.2 | 1.14 | 92.8 |
| Example 9 | 90.2 | 1.15 | 92.0 |
| Example 10 | 92.1 | 1.14 | 92.5 |
| Example 11 | 93.1 | 1.12 | 93.8 |
| Comp. Ex. 1 | 83.1 | 1.18 | 90.2 |
| Comp. Ex. 2 | 81.8 | 1.25 | 84.6 |
| Comp. Ex. 3 | 87.5 | 1.19 | 88.7 |
| Comp. Ex. 4 | 85.3 | 1.31 | 84.9 |
| Comp. Ex. 5 | 89.9 | 1.18 | 92.0 |
| Comp. Ex. 6 | 78.6 | 1.30 | 87.5 |
| Comp. Ex. 7 | 80.3 | 1.38 | 84.6 |
| Comp. Ex. 8 | 71.1 | 1.55 | 80.2 |
| Comp. Ex. 9 | 89.6 | 1.32 | 89.4 |
| Comp. Ex. 10 | 74.8 | 1.69 | 80.1 |
| Comp. Ex. 11 | 91.9 | 1.14 | 93.1 |
| Comp. Ex. 12 | 91.0 | 1.16 | 92.0 |
| Comp. Ex. 13 | 90.2 | 1.20 | 90.6 |

RRR*: Resistance rise rate
CRR**: Capacity recovery rate

What is claimed is:

1. A lithium ion secondary battery comprising
a positive electrode,
a negative electrode and
an electrolysis solution containing an aprotic solvent having an electrolyte dissolved in it, wherein said negative electrodes comprises an amorphous carbon material as a negative electrode active material,
wherein said amorphous carbon material has an average particle diameter (median size) of 7 μm to 20 μm inclusive as measured by a laser diffraction scattering method and a particle size distribution as measured by a laser diffraction scattering method, in which distribution a ratio of particles of less than 3 μm in a diameter is 1% by mass to 10% by mass inclusive, and is free of an electrical conducting material.

2. The lithium ion secondary battery according to claim 1, wherein said amorphous carbon material has a weight change of less than 3% by weight as measured after 50 hours in an environment having a temperature of 40° C. and a humidity of 90%.

3. The lithium ion secondary battery according to claim 1, wherein the lithium ion secondary battery is sealed up by a film wrap comprising a flexible film.

4. The lithium ion secondary battery according to claim 2, wherein the lithium ion secondary battery is sealed up by a film wrap comprising a flexible film.

* * * * *